Aug. 17, 1937. M. WAGNER 2,090,561
SUSPENSION MEANS OF PARTS ON VEHICLE FRAMES
Filed April 3, 1935
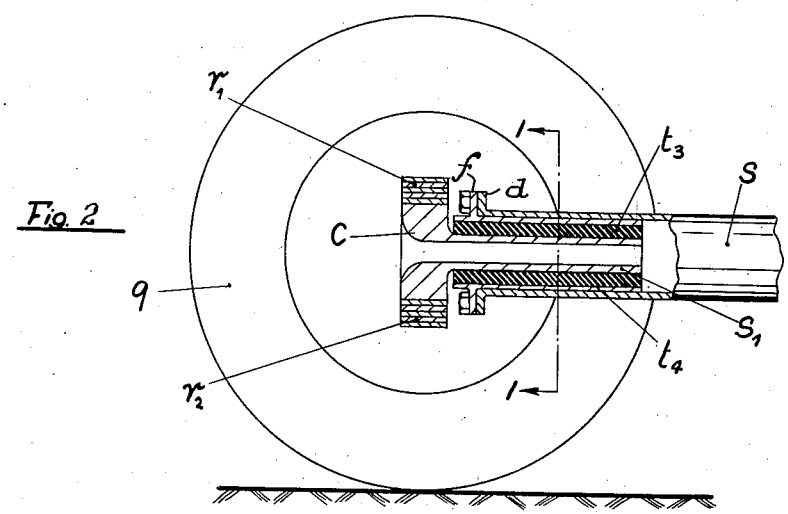
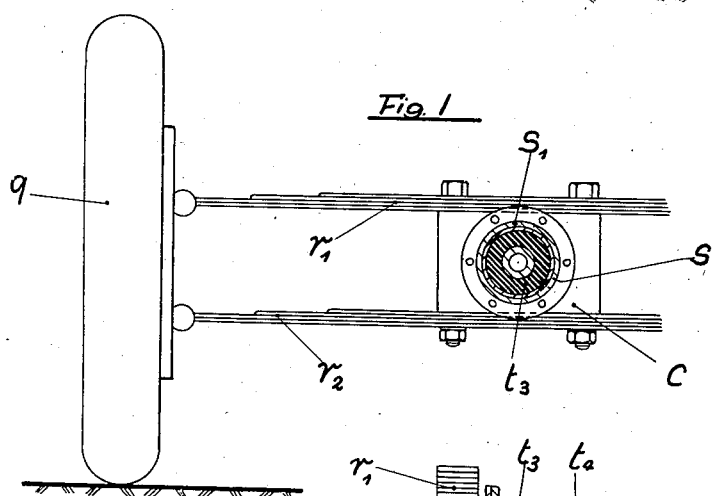
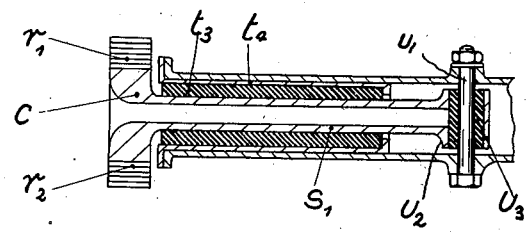
Inventor.
M. Wagner Patented Aug. 17, 1937

2,090,561

UNITED STATES PATENT OFFICE 2,090,561

SUSPENSION MEANS OF PARTS ON VEHICLE FRAMES

Max Wagner, Stuttgart, Germany, assignor to Daimler-Benz Aktiengesellschaft, Stuttgart-Unterturkheim, Germany Application April 3, 1935, Serial No. 14,503
In Germany April 3, 1934

1 Claim. (Cl. 280—112)

This invention relates to springing systems for power driven vehicles having independently guided vehicle wheels and has for its object to improve such springing systems in which the suspension means for the individual vehicle wheels, for example swinging half axles, links or leaf springs, are carried singly or in pairs on a shaft member which is mounted on a corresponding member on the frame with the interposition of rubber cushioning means.

In order that the rubber cushioning means may produce the action required of them they have to be inserted between the relatively movable axle members with considerable initial stress which renders the assembling on and the removal of the suspension system from the vehicle a very difficult matter. The present invention has for its main object to provide a springing system of the type described which will be capable of easy removal from the vehicle. With this object in view, the present invention consists in providing the rubber cushioning means in the form of a bush with a reinforcing sleeve which is housed in the tubular frame and bolted thereto or secured thereto by means of a transverse pin passed through the tubular frame and through the shaft on which the suspension means for the wheels are mounted, the said shaft being preferably either connected to the transverse pin through the intermediary of an elastic body or the transverse pin being elastically mounted on the frame.

The invention is illustrated by way of example in the accompanying drawing in two embodiments.

Fig. 1 shows a wheel suspension structure having two parallel laminated leaf springs, in cross-section on the line 1—1 of Fig. 2 and Fig. 2 shows the arrangement according to Fig. 1 in longitudinal section.

Fig. 3 shows a modified detail arrangement of the structure shown in Fig. 2.

Referring to Figs. 1 and 2, $q$ is one of a pair of wheels, for instance the front wheels of a power driven vehicle, which are sprung and supported by means of transverse leaf springs $r_1$, $r_2$ secured to a common central member $c$ having a rearwardly extending tubular shaft $s_1$. The shaft $s_1$ is inserted in a tubular rubber body $t_3$ which is surrounded by a rigid sleeve $t_4$ which is inserted in the open end of a central tubular frame member $s$ and, together with the rubber body $t_3$, the central member $c$ and the wheel supporting means thereon forms an axle unit. The sleeve $t_4$ is provided with a flange $f$ which is bolted to a terminal flange $d$ on the tubular frame $s$, thereby retaining the entire axle unit in position on the frame.

In order to prevent the rubber body or bush $t_3$ from turning relatively to the shaft $s_1$ and the sleeve $t_4$ it may be secured by vulcanization of its inner surface to the shaft $s_1$ and of its outer surface to the sleeve $t_4$. By this means limited rotary motion of the central support $c$ about the longitudinal axis of the shaft $t_4$, and incidentally of the vehicle is possible, the rubber bush $t_3$ being stressed in torsion.

Instead of the rubber bush $t_3$ being vulcanized to the shaft $s_1$ and the sleeve $t_4$, it may be held under pressure between the shaft and the sleeve.

In the modified constructional form shown in Fig. 3 the shaft $s_1$ of the central member $c$ which carries the leaf springs $r_1$ and $r_2$ is provided at its rear end with an eye $u_2$ which is lined with a rubber bush $u_3$ through which is passed a pin $u_1$, which extends through the frame tube $s_1$. By this means the central supporting member $c$ is secured to the frame tube in such a manner that it is capable of yielding elastically to a limited extent in all directions.

What I claim is:—

A springing system for vehicles, comprising in combination a hollow frame member, a rigid sleeve inserted in the frame member, a rubber bush in said rigid sleeve, a shaft member in said rubber bush having a central support thereon, wheel guiding means for a pair of vehicle wheels mounted on said support, said rubber bush being applied to the shaft and rigid sleeve, so as to permit of a limited amount of rotary motion of the shaft and the frame member relatively to one another, an eye on the shaft behind the rigid sleeve, a rubber bush in said eye, and a pin removably arranged through said bush and transversely through the hollow frame member, substantially as and for the purposes set forth.

MAX WAGNER.